(12) United States Patent
Mamiya

(10) Patent No.: US 6,690,415 B1
(45) Date of Patent: *Feb. 10, 2004

(54) CAMERA, CAMERA CONNECTING DEVICE, AND CAMERA SYSTEM

(75) Inventor: Akira Mamiya, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,740

(22) Filed: Dec. 5, 1997

(30) Foreign Application Priority Data

Dec. 10, 1996 (JP) ............................... 8-329747

(51) Int. Cl.⁷ ............................................. H04N 5/225
(52) U.S. Cl. ..................... 348/207.1; 348/231; 348/373; 348/375; 348/552
(58) Field of Search ................................ 348/207, 231, 348/373, 375, 552, 211.6, 207.99, 207.1, 207.11, 231.99, 231.6, 231.7

(56) References Cited

U.S. PATENT DOCUMENTS

| 4,901,364 | A | | 2/1990 | Faulkerson et al. ........... 382/59 |
|---|---|---|---|---|
| 5,392,386 | A | | 2/1995 | Chalas ........................ 395/155 |
| 5,402,170 | A | * | 3/1995 | Parulski et al. .......... 348/211.6 |
| 5,438,359 | A | * | 8/1995 | Aoki .......................... 348/552 |
| 5,475,441 | A | * | 12/1995 | Parulski et al. ............. 348/552 |
| 5,506,617 | A | * | 4/1996 | Parulski et al. ............. 348/552 |
| 5,633,678 | A | * | 5/1997 | Parulski et al. ............. 348/552 |
| 6,111,604 | A | * | 8/2000 | Hashimoto et al. ......... 348/552 |
| 6,118,485 | A | * | 9/2000 | Hinoue et al. .............. 348/373 |

FOREIGN PATENT DOCUMENTS

| JP | 08-069048 | 3/1996 |
|---|---|---|
| JP | 08-275098 | 10/1996 |

OTHER PUBLICATIONS

"Integrated Computer and Camera," IBM Technical Disclosure Bulletin, vol. 37. No. 10, Oct. 1994.
European Search Report, Ref. No. 2552930, dated May 18, 1999.

* cited by examiner

Primary Examiner—Wendy R. Garber
Assistant Examiner—Luong Nguyen
(74) Attorney, Agent, or Firm—Fitzpatrick, Cella, Harper & Scinto

(57) ABSTRACT

A camera connectable to an external device includes an image pick-up unit for picking-up an image and for generating a corresponding image signal, and a release switch. The release switch selectively may be set to perform one of a plurality of functions, where the function of the release switch can be changed by the external device connected to the camera.

4 Claims, 7 Drawing Sheets

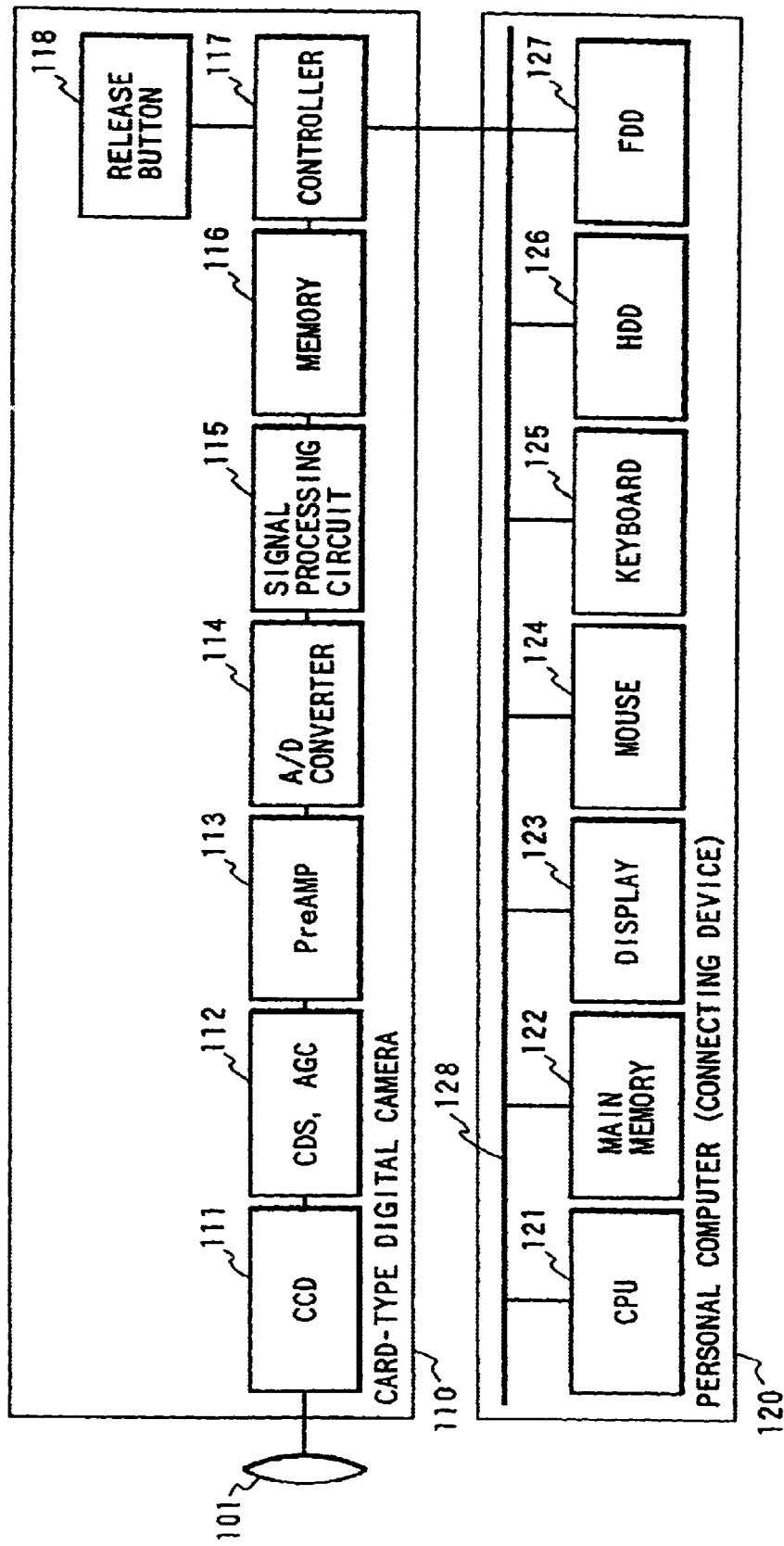

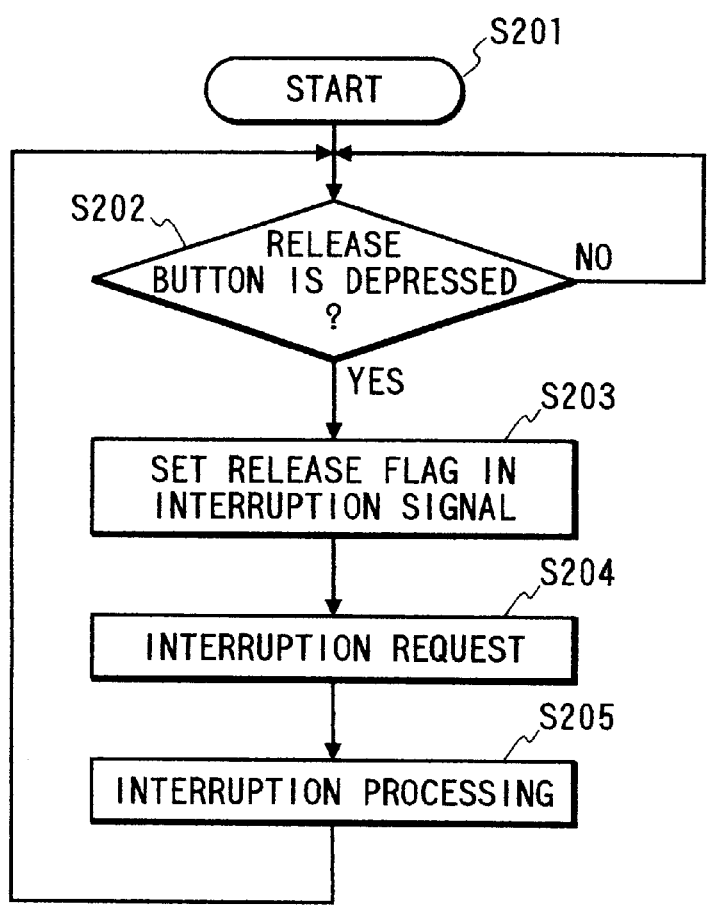

CAMERA, CAMERA CONNECTING DEVICE, AND CAMERA SYSTEM

BACKGROUND OF THE INVENTION

1. Field of the Invention

The present invention relates to a camera removably connected to an external connecting device such as a personal computer, a personal digital assistant (PDA: information terminal equipment) or a word processor, to a connecting device for use with a camera, and to such a camera system including such a camera and connecting device.

2. Related Background Art

A digital camera for digital recording is known such as shown in FIG. 7. In FIG. 7, reference numeral 710 represents a card-type digital camera, and reference numeral 720 represents a general personal computer (hereinafter called a PC). The internal structures thereof are shown in block in FIG. 7.

In the structures shown in FIG. 7, a subject image passed through a lens 701 of an optical system is picked up by an image pickup element CCD 711, subjected to predetermined processes such as CDS and AGC, and amplified to a predetermined level by a pre-amplifier 713. The analog image signal is then converted into a digital image signal by an A/D converter 714, processed by a signal processing circuit 715, and temporarily stored in a memory 716.

The above-described operations are controlled by a controller 717 which also outputs an interrupt signal to a PC 720. Upon reception of this interrupt signal, PC 720 performs an interrupt routine.

PC 720 is generally constituted of a CPU 721, a main memory 722, a display 723, a mouse 724, a keyboard 725, an HDD 726, an FDD 727 and a local bus 728.

In such a conventional card-type digital camera system, the interrupt routine of PC 720 copies an image in the memory 716 into the main memory 722 under the control of CPU 721 of PC 720. This copied image is displayed on the display 723 by an application program. If these operations are performed successively, a moving image can be displayed. If a space key of the keyboard is depressed during the display of a moving image, a still image can be saved in a clip board or in a disk medium such as a hard disk.

With such a conventional camera system of the type that a camera head unit and a camera card are interconnected by a cable, a still image can be picked up only by actuating a keyboard or mouse of the PC.

SUMMARY OF THE INVENTION

The present invention has been made in order to solve the above problem and provides a camera capable of picking up a still image by actuating a release switch of the camera, a connecting device for such a camera and a camera system thereof.

According to one aspect of the present invention, a camera is configured as follows:
(1) A camera is removably connected to an external connecting device such that the function of a release switch of the camera can be changed by the connecting device connected to the camera.
(2) The camera described in (1), wherein the release switch performs a desired function, in accordance with selecting means in application software.
(3) The camera described in (1), wherein a medium stores the status of the release switch, and the status stored in the medium is changed as desired by selecting means provided in application software.
(4) The camera described in (3), wherein the medium is a disk.
(5) The camera described in (3), wherein the medium is a shared memory.
(6) The camera described in (1), wherein an interrupt signal is sent to the connecting device upon actuation of the release button, and in response to the interrupt signal the connecting device processes an image signal picked up by the camera.

According to another aspect of the present invention, a camera connecting device is configured as follows:
(7) A connecting device is removably connected to a camera, and includes input means having the same function as a release switch of the camera.
(8) A connecting device is removably connected to a camera, and includes means for detecting whether the camera is equipped with a release switch.

According to still another aspect of the present invention, a camera system is configured as follows:
(9) A camera system includes a camera and a connecting device removably connected to the camera, the system includes means for detecting whether a camera with a release switch or a camera without a release switch is connected in the system.
(10) The system described in (9) wherein, the system is adapted to start up a photographing operation by the release switch of the camera, when the camera having the release switch is connected.
(11) The system described in (9), wherein a display of the detecting means is changed in accordance with a detection to whether a camera with a release switch or a camera without a release switch is connected in the system.

Other objects and features of the present invention will become more apparent from the following detailed description the preferred embodiments when read in conjunction with the accompanying drawings.

BRIEF DESCRIPTION OF THE DRAWINGS

FIG. 1 is a block diagram showing the structure of a camera system of this invention.

FIG. 2 is a flow chart illustrating the operation of a camera side according to a first embodiment of the invention.

DETAILED DESCRIPTION OF THE PREFERRED EMBODIMENTS

Figure 7:
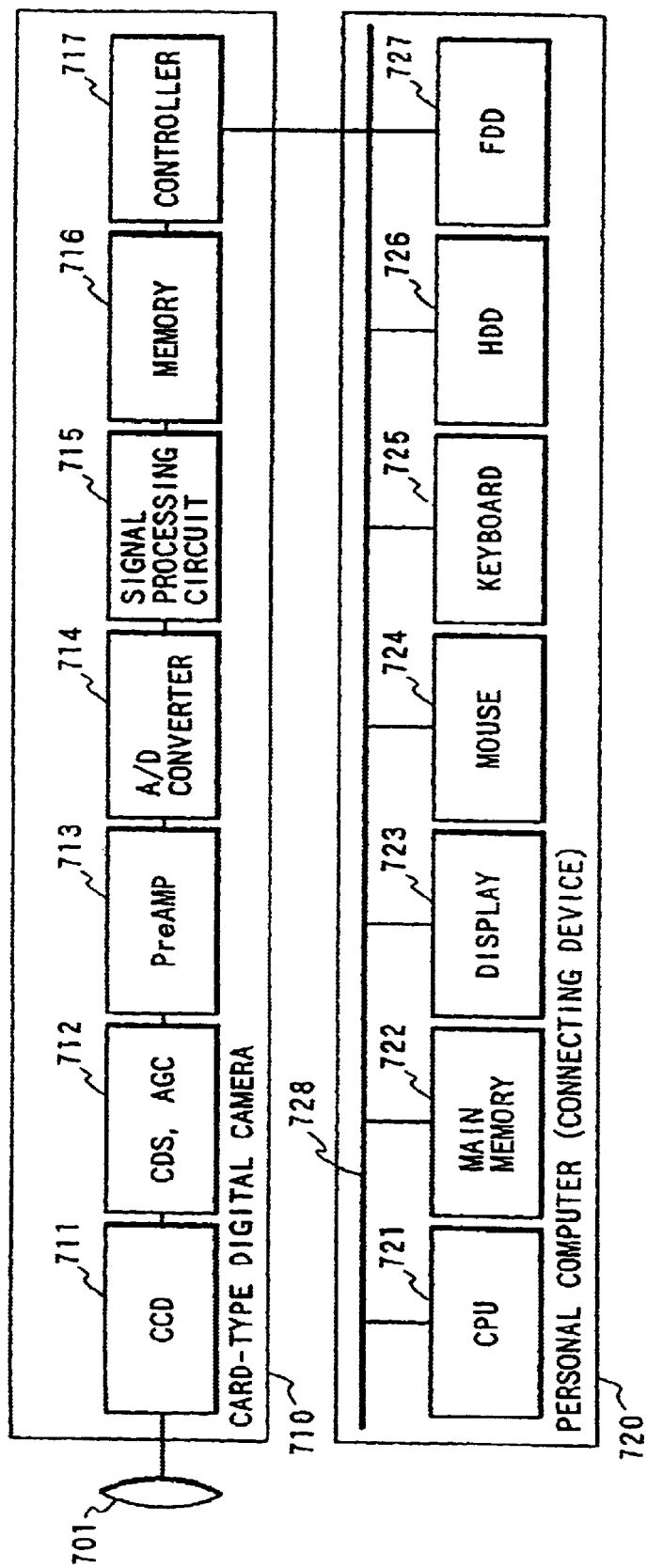
FIG. 7 is a block diagram showing the structure of a conventional camera system.

FIG. 1 is a block diagram showing the structure of a camera system of the invention, the structure being basically the same as that of the system shown in FIG. 7.

In FIG. 1, reference numeral 101 represents a lens of an optical system for focussing a subject image, and reference numeral 110 represents a card-type digital camera capable of being removably mounted on a card slot of a PC 120 which is an external connecting device. The camera 110 has an electrical circuit for interconnecting the optical system and PC 120 together.

In the card-type digital camera 110, reference numeral 111 represents an image pickup CCD for converting a subject image (optical image) passed through the lens 101 of the optical system into an electrical signal. Reference numeral 112 represents a correction circuit for performing predetermined signal processing such as CDS and AGC. Reference numeral 113 represents a pre-amplifier for amplifying the signal corrected by the correction circuit 112. Reference numeral 114 represents an A/D converter for converting the amplified analog image signal into a digital image signal. Reference numeral 115 represents a signal processing circuit for performing predetermined digital signal processing. Reference numeral 116 represents a writable memory, reference numeral 117 represents a controller for controlling the whole operation of the camera system, and reference numeral 118 represents a release button (switch).

In PC 120, reference numeral 121 represents a CPU for controlling the entire operation of the PC, reference numeral 122 represents a main memory, reference numeral 123 represents a display for displaying various information, reference numerals 124 and 125 represent a mouse and a keyboard, respectively, as input means, reference numeral 126 represents an HDD, and reference numeral 127 represents an FDD. These elements are connected via a local bus 128 to the controller 117.

The external connecting device such as PC 120 may be a PDA, a word processor or the like. In this embodiment, a PC is used by way of example.

Next, the operation of the camera system of the first embodiment will be described with reference to FIGS. 2, 3A and 3B.

FIG. 2 is a flow chart illustrating the operation of release means on the camera side. After a power of the camera 110 is turned on at Step S201, it is checked at Step S202 whether the release button 118 is depressed. If depressed, the flow advances to Step S203, whereas if not, the flow remains in a continuous loop at Step S202 to monitor a depression state of the release button 118.

At Step S203 the controller 117 sets a release flag to an interrupt signal. Next at Step S204 an interrupt request is issued to the PC side. At Step S205 an interrupt process is performed on the PC side to thereafter terminate this process.

Figure 3A:
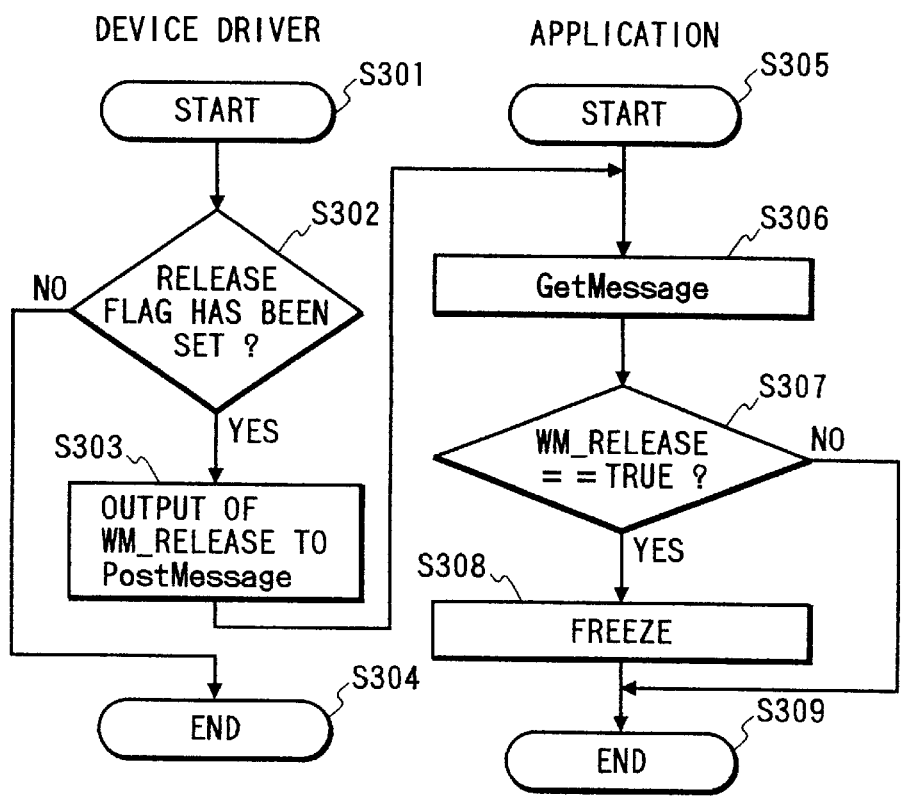
FIGS. 3A and 3B are flow charts illustrating the operation of a connecting device side according to the first embodiment of the invention.
Figure 3B:
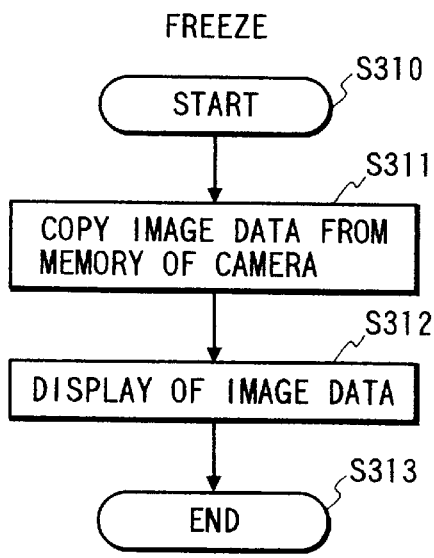

FIGS. 3A and 3B are flow charts illustrating the operation to be performed on the PC (connecting device) side, this operation corresponding to the interrupt process at S205 on the PC side shown in FIG. 2. FIG. 3A illustrates the processes of device driver software and application software, and FIG. 3B illustrates a freeze process.

When the interrupt process starts at Step S301, it is checked at Step S302 whether the release flag is set. If set, the flow advances to Step S303, whereas if not, the flow advances to Step S304 whereat the release interrupt process of the device driver software is terminated.

At Step S303, a message "WM_RELEASE" is output (PostMessage) to the application software. PostMessage is a standard function of Windows API for sending a message to an application. Windows API is an application programming interface of MICROSOFT WINDOWS (registered trademarks or trademark of Microsoft Corporation). This message is not immediately processed by the application software but is loaded in a message queue.

Therefore, the message from the driver software does not synchronize with a freeze process (to be later described) of the application software. This message may be made synchronous. However, in this case, a message sent to each application is assigned uniquely so that the application which does not know this message cannot run.

When the application program starts at Step S305, the message is picked up (GetMessage) from the message queue at Step S306. At Step S307 it is checked whether WM_RELEASE=TRUE. If true, the flow advances to Step S308, whereas if not, this release interrupt process is terminated at Step S309.

At Step S308 the freeze process is performed to terminate this release interrupt process at Step S309.

The freeze process starts at Step S310. Before this operation, the display 123 of PC 120 is in a preview state. In this preview state, a moving image is continuously displayed on the display 123 by copying image data from the memory 116 of the card-type camera 110 to the main memory 122 of PC 120. In this preview state, the main memory 122 of PC 120 is used temporarily and when new image data is copied, the contents of the main memory 122 are overwritten.

At Step S311 image data in the memory 116 of the camera 110 is copied to the main memory 122 of PC 120. This main memory is a semiconductor storage medium such as a DRAM, and image data in the main memory 122 may be copied later to a disk in the form of an image file. Next at Step S312 the image data in the main memory 122 of PC 120 is displayed on the display 123 as a still image to terminate this freeze process at Step S313.

A second embodiment of this invention now will be described. In this embodiment, the application software is changed as shown in FIG. 4 in order to use the release button 118 of the camera 110 for the actuation of the freeze (release) process.

Figure 4:
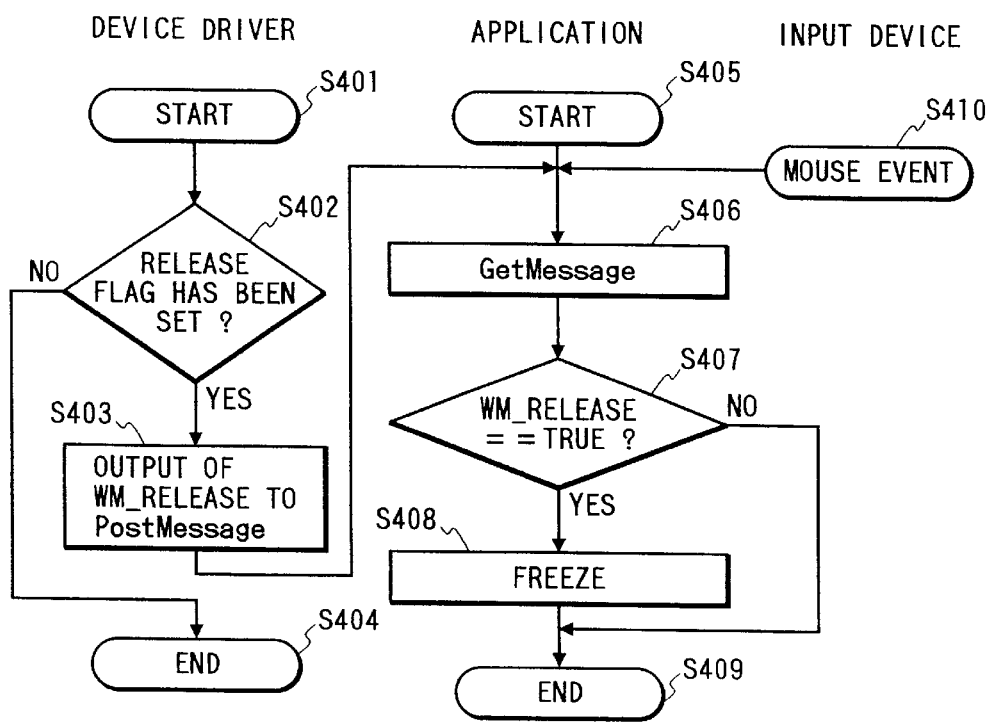
FIG. 4 is a flow chart illustrating the operation of a connecting device side according to a second embodiment of the invention.

FIG. 4 is a flow chart illustrating an interrupt process on the PC side with device driver software, application software and an event from an input device.

When the interrupt process starts at Step S401, it is checked at Step S402 whether the release flag is set. If set, the flow advances to Step S403, whereas if not, the flow advances to Step S404 whereat the release interrupt process of the device driver software is terminated.

At Step S403, a message "WM_RELEASE" is output (PostMessage) to the application software. Such a message sent to each application is assigned uniquely so that an application which does not know this message cannot run.

When the application program starts at Step S405, the message sent in response to a mouse event, a keyboard event or from the driver software is picked up from the message queue at Step S406. This event was issued from the input device such as a mouse and loaded in the message queue in a first-in first-out (FIFO) manner in an OS application such as MICROSOFT® WINDOWS® 95 or another WINDOWS® system. At Step S407 it is checked whether WM_RELEASE=TRUE. If true, the flow advances to Step S408, whereas if not, this release interrupt process is terminated at Step S409.

At Step S408 a freeze process is performed to terminate this release interrupt process at Step S409.

As above, a user can use the release request of the camera and the freeze request of the application software as release buttons of the same function, since both requests are processed as the same request.

Next, a third embodiment of the invention will be described. The application program is changed as shown in FIG. 5 to selectively set the release button 118 of the camera 110 to have a desired function such as saving a still image into a disk, saving a still image into a clip board, or not saving a still image.

Figure 5:
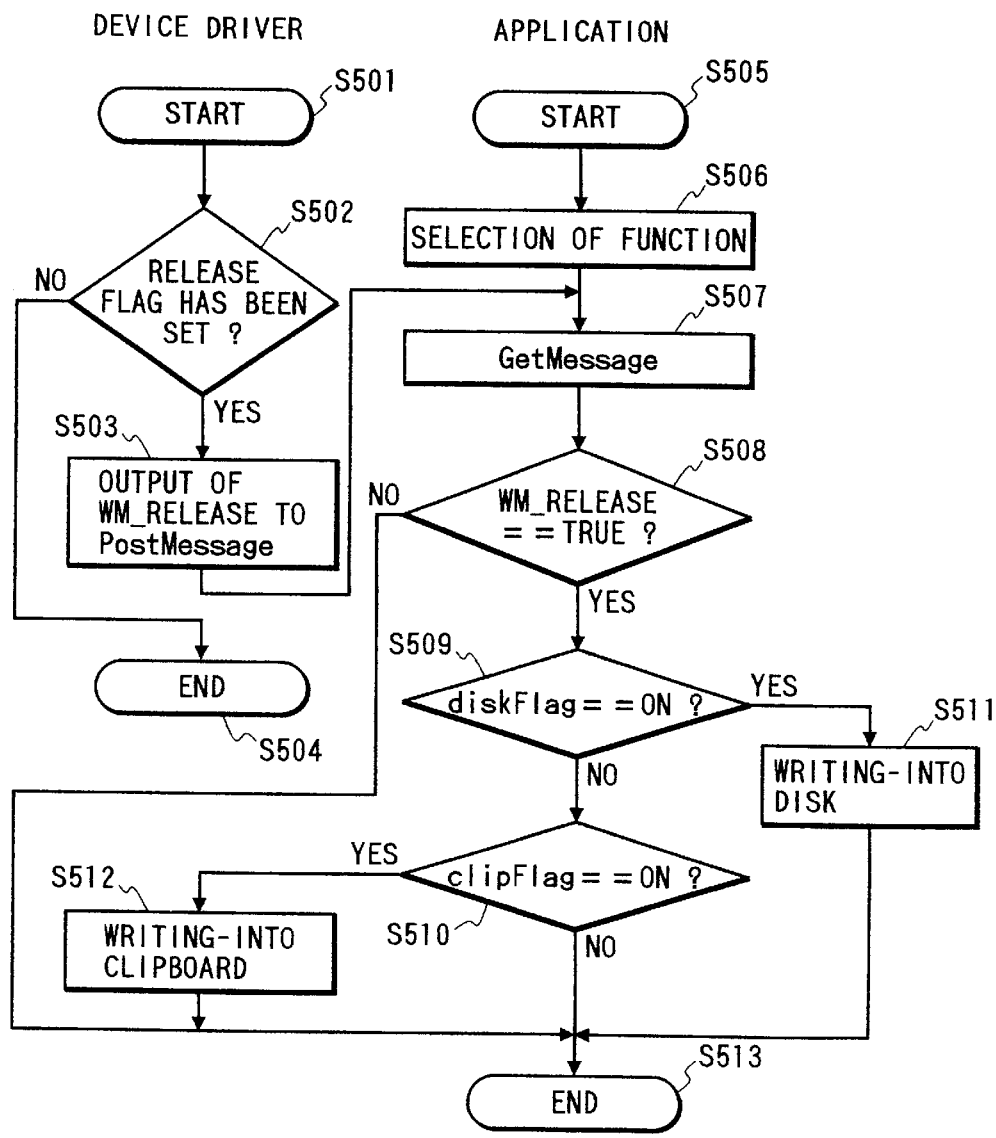
FIG. 5 is a flow chart illustrating the operation of a connecting device side according to a third embodiment of the invention.

FIG. 5 is a flow chart illustrating the interrupt process on the PC side with device driver software and application software.

When the interrupt process starts at Step S501, it is checked at Step S502 whether the release flag is set. If set, the flow advances to Step S503, whereas if not, the flow advances to Step S504 whereat the release interrupt process of device driver software is terminated.

At Step S503, a message "WM_RELEASE" is output (PostMessage) to the application software. When the application program starts at Step S505, a desired function is selected from a menu supplied by the application program at Step S506. If the still image is to be saved in the disk, diskFlag=ON and clipFlag=OFF are set. If the still image is to be saved in a clip board, diskFlag=OFF and clipFlag=ON are set. If the still image is not to be saved, diskFlag=OFF and clipFlag=OFF are set.

Next at Step S507 the message from the driver software is picked up from the message queue. At Step S508 it is checked whether WM_RELEASE=TRUE. If true, the flow advances to Step S509, whereas if not, this release interrupt process is terminated at Step S513.

If diskFlag=ON at Step S509, the flow advances to Step S511, whereas if not, the flow advances to Step S510. If clipFlag=ON at Step S510, the flow advances to Step S512, whereas if not, the flow advances to Step S513. At Step S511, the still image is written in the disk which may be a hard disk, a floppy disk, a removable hard disk flash disk, compact flash disk, or a magnetooptical disk.

At Step S512 the still image is written in a clip board used as a system shared memory provided by an OS application such as MICROSOFT® WINDOWS® 95. By using this clip board, the still image may be pasted to another application or the like.

As above, a user selects a desired function from the menu supplied by the application program so that the function of the release button 118 of the camera 110 can be selectively set to one of saving a still image into a disk, saving a still image into a clip board, and not saving a still image.

Next, the fourth embodiment of the invention will be described. The application program is changed as shown in FIGS. 6A and 6B to allow discrimination between a camera with a release button and a camera without a release button.

Figure 6A:
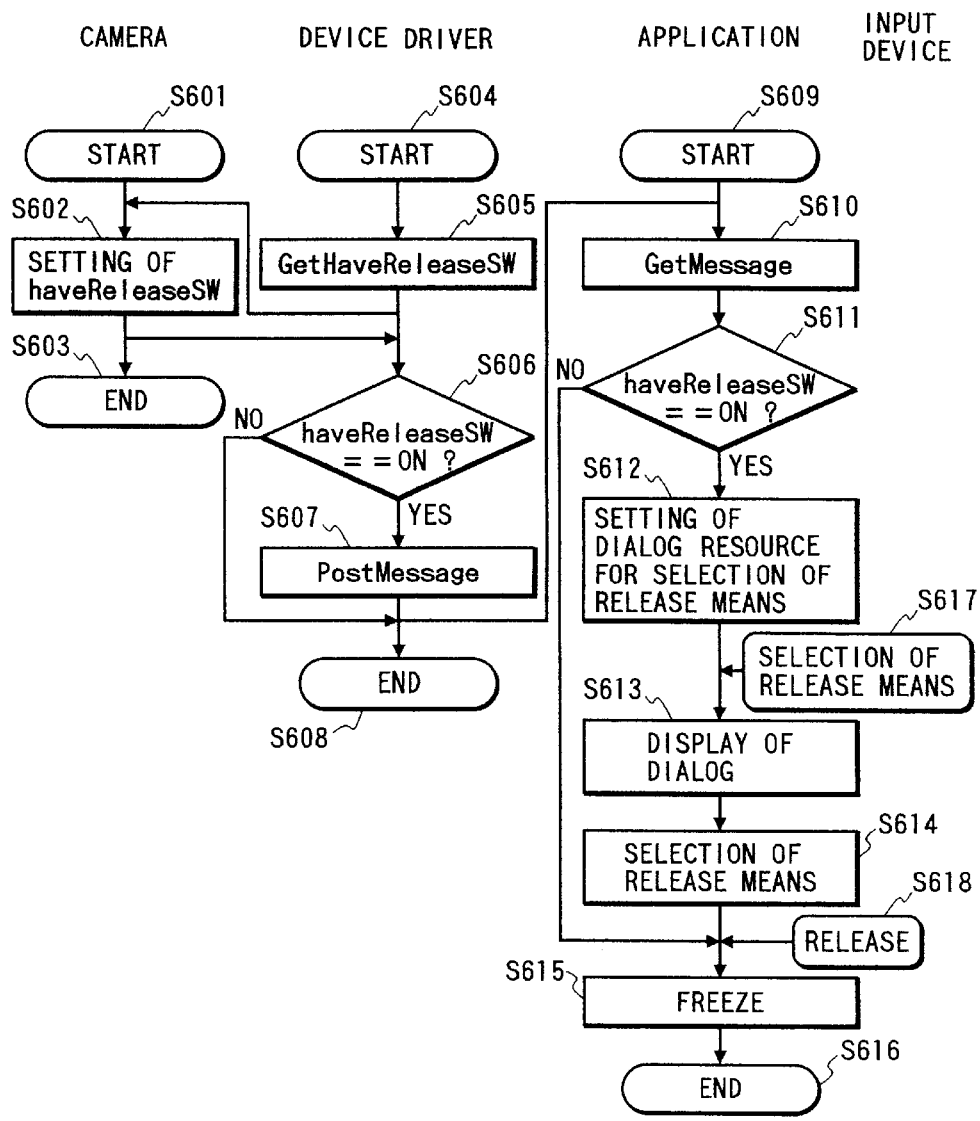
FIGS. 6A and 6B are flow charts illustrating the operation of a connecting device side according to a fourth embodiment of the invention.
Figure 6B:
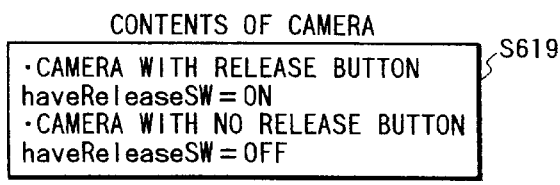

FIGS. 6A and 6B are flow charts illustrating the operation of the interrupt process on the PC side. FIG. 6A illustrates the operation to be executed by the camera, device driver software and application software, and FIG. 6B illustrates the contents of a camera to be displayed.

As a camera 110 is loaded at Step S601, a haveReleaseSW is set at Step S602 to thereafter terminate this camera side process.

As the driver software is activated at Step S604, information on a presence/absence of the release button 118 of the camera 110 is acquired at Step S605. If haveReleaseSW= (ON at Step S606, the flow advances to Step S607, whereas if not, the flow advances to Step S608 to terminate the device driver process.

At Step S607 a message "haveReleaseSW" is output (PostMessage) to the application software. As the application program starts at Step S609, the message is acquired from the message queue at Step S610. If haveReleaseSW=ON at Step S611, the flow advances to Step S612, whereas if not, the flow advances to Step S615.

At Step S612 a resource for displaying a dialogue for selecting release means is set. In this case, the dialogue resource for selecting release means is set if haveReleaseSW=ON, and is not set if haveReleaseSW=OFF.

At Step S613, the dialogue for selecting release means is displayed. This dialogue is a kind of window generated either by an application with windows or an application without windows.

Next at Step S614 the release means is selected to perform the freeze process at Step S615. This application program terminates at Step S616.

At Step S617, the release means may be selected by a mouse event or a keyboard event of the input device. The release operation may be performed by the camera or an input device such as a mouse or a keyboard at Step S618.

The contents in the storage medium of the camera are displayed at Step S619. The contents are haveReleaseSW=ON for a camera with a release button and haveReleaseSW=OFF for a camera without a release button.

As described so far, according to the present invention, it is possible to take a still image by operating the release button of a camera, although the keyboard or mouse of the connecting device has been used conventionally for this purpose. It is therefore possible to take a still image even if the connecting device and the camera head are positioned remotely.

Further, a user can perform the same function of taking a still image either from a freeze request of the application software (in response to an event issued from an input device such as a keyboard or a mouse) or from a release request of the camera. A user can therefore selectively use the one of them which is suitable for a particular image pickup environment.

Still further, the function of the release button can be selectively set as desired by the application software.

Still further, by providing means for discriminating between a camera with a release button and a camera without a release button, both cameras with and cameras without a release button can be used with the same driver and application software.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device connectable to a camera, the device comprising:
   a communication unit that communicates with the camera connected to said device, said communication unit receiving information from the camera; and
   a control unit that detects, information received by said communication unit, which information represents whether or not the camera which is connected to said device has a switch for performing an image pickup operation of the camera, and changes a process of said device in accordance with a detection result.

2. A device according to claim 1, further comprising:
   a display unit that changes a display of a function of the camera connected to said device, in accordance with the detection result.

3. A communication method for a device connectable to a camera, the communication method comprising:
- a communicating step of communicating information from the camera to the device when the camera is connected to the device; and
- a controlling step of detecting information received by the device, which information represents whether or not the camera which is connected to the device has a switch for performing an image pickup operation of the camera, and changing a process of the device in accordance with a detection result.

4. A communication method according to claim 3, further comprising:
- a display control step of changing a display of a function characteristic of the camera connected to the device in accordance with the detection result.

* * * * *

UNITED STATES PATENT AND TRADEMARK OFFICE
CERTIFICATE OF CORRECTION

PATENT NO. : 6,690,415 B1
DATED : February 10, 2004
INVENTOR(S) : Akira Mamiya

It is certified that error appears in the above-identified patent and that said Letters Patent is hereby corrected as shown below:

Column 2,
Line 33, "to" should be deleted.
Line 37, "tion" should read -- tion of --.

Column 5,
Line 35, "hard disk" should read -- hard disk, --.
Line 63, "(ON" should read -- ON --.

Signed and Sealed this

Twenty-second Day of June, 2004

JON W. DUDAS
*Acting Director of the United States Patent and Trademark Office*